United States Patent [19]
Jankovic

[11] Patent Number: 5,690,308
[45] Date of Patent: Nov. 25, 1997

[54] SEMI-AUTOMATIC SWING OUT CUP HOLDER

[75] Inventor: Tomislav Jankovic, Etobicoke, Canada

[73] Assignee: Manchester Plastics, Inc., Troy, Mich.

[21] Appl. No.: 476,230

[22] Filed: Jun. 7, 1995

[51] Int. Cl.$^6$ .................................................. A47K 1/08
[52] U.S. Cl. .................................... 248/311.2; 248/314
[58] Field of Search .................... 297/188.21, 188.01; 224/926; 248/311.2, 289.11, 292.12, 314

[56] References Cited

U.S. PATENT DOCUMENTS

| | | | |
|---|---|---|---|
| 4,511,072 | 4/1985 | Owens | 224/926 |
| 5,085,390 | 2/1992 | Murphy | 248/311.2 |
| 5,330,146 | 7/1994 | Spykerman | 224/926 |
| 5,342,009 | 8/1994 | Lehner | 248/311.2 |
| 5,489,054 | 2/1996 | Schiff | 248/311.2 |

Primary Examiner—Leslie A. Braun
Assistant Examiner—Willie Berry, Jr.
Attorney, Agent, or Firm—Bliss McGlynn, P.C.

[57] ABSTRACT

A dual cup holder apparatus (10) includes a housing (16) formed with a pocket (18) therein and extending through a top side (20) and front side (22) forming a first cup holder (12). A second cup holder (14) is pivotally connected to the housing (16) and with the first cup holder (12) to vertically rotate into the first cup holder (12) in a stored position and to vertically rotate out of the first cup holder (12) to a use position allowing both cup holders (12,14) to receive beverage containers.

7 Claims, 2 Drawing Sheets

SEMI-AUTOMATIC SWING OUT CUP HOLDER

TECHNICAL FIELD

The invention relates to cup holders generally utilized in vehicles, and more particularly to dual cup holders.

BACKGROUND OF THE INVENTION

Cup holders or container holders utilized in vehicles are commonly known in the art. Such cup holders include concealed holders able to be actuated to move into an extended and use position, while providing dual cup holders which may be conveniently and efficiently stored in a vehicle. Such cup holders commonly extend from instrument panels or arm rests, or any other location on the vehicle. Because available storage space for the cup holder is limited, the cup holder must have a compact storage shape. Minimizing the storage size of cup holders is particularly important when the unit is designed to hold more than one container in a vehicle.

Various designs have been proposed such as U.S. Pat. No. 5,060,899, issued Oct. 29, 1991, in the name of Lorence et al., and U.S. Pat. No. 5,330,146, issued Jul. 19, 1994, in the name of Spykerman. Both patents disclose dual cup holders wherein a second cup holder is horizontally rotated out from within a first cup holder for use, and the compact cup holders are able to be retracted within an arm rest or other housing of the vehicle.

U.S. Pat. No. 5,018,633 issued May 28, 1991, in the name of Toth et al., discloses a dual cup holder in which each of the individual cup holders rotates from a vertical position to its horizontal use position. However, this design does not provide a significant, compact design.

There are a wide variety of cup holders in the art. However, it is continuously desirable to develop new cup holders designs which are efficient in space constraint and simple in use and design.

SUMMARY OF THE INVENTION

A cup holder apparatus comprising a housing; a first cup holder supported by said housing for supporting a first container; a second cup holder pivotally connected to said first cup holder for rotating between a stored position with said second cup holder positioned within said first cup holder and a use position with the second cup holder extending outwardly from said first cup holder allowing said first and said second cup holders to each receive a beverage container, said second cup holder rotating in a vertical direction between said stored position and said use position.

BRIEF DESCRIPTION OF THE DRAWINGS

Advantages of the invention will become readily appreciated as the same becomes better understood by reference to the following detailed description when considered in connection with the accompanying drawings wherein.

DETAILED DESCRIPTION OF THE INVENTION

Figure 2:
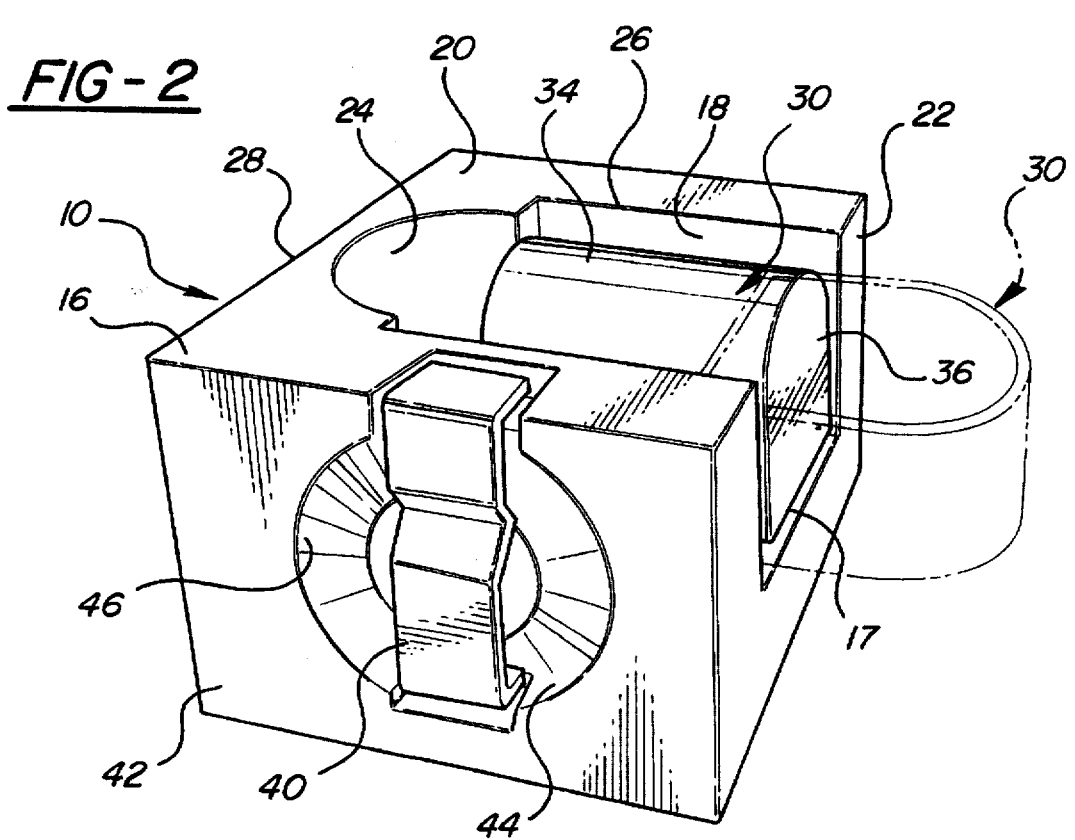
FIG. 2 is a perspective view of the subject invention in its stored position.
Figure 3:
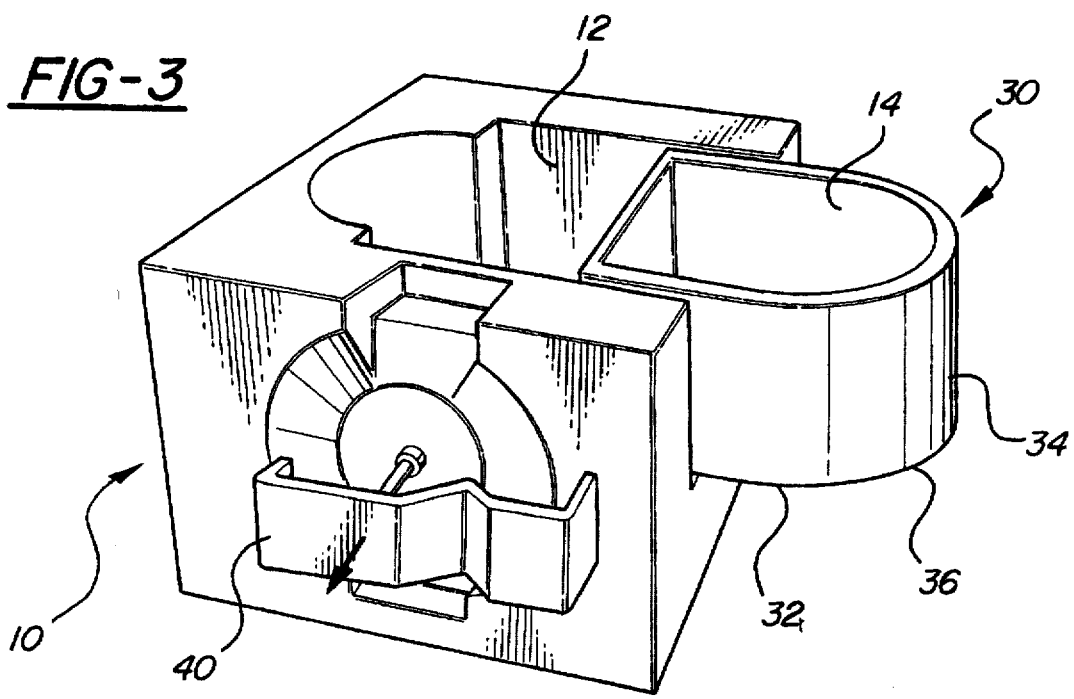
FIG. 3 is a perspective view of the subject invention rotated to its extended position.
Figure 4:
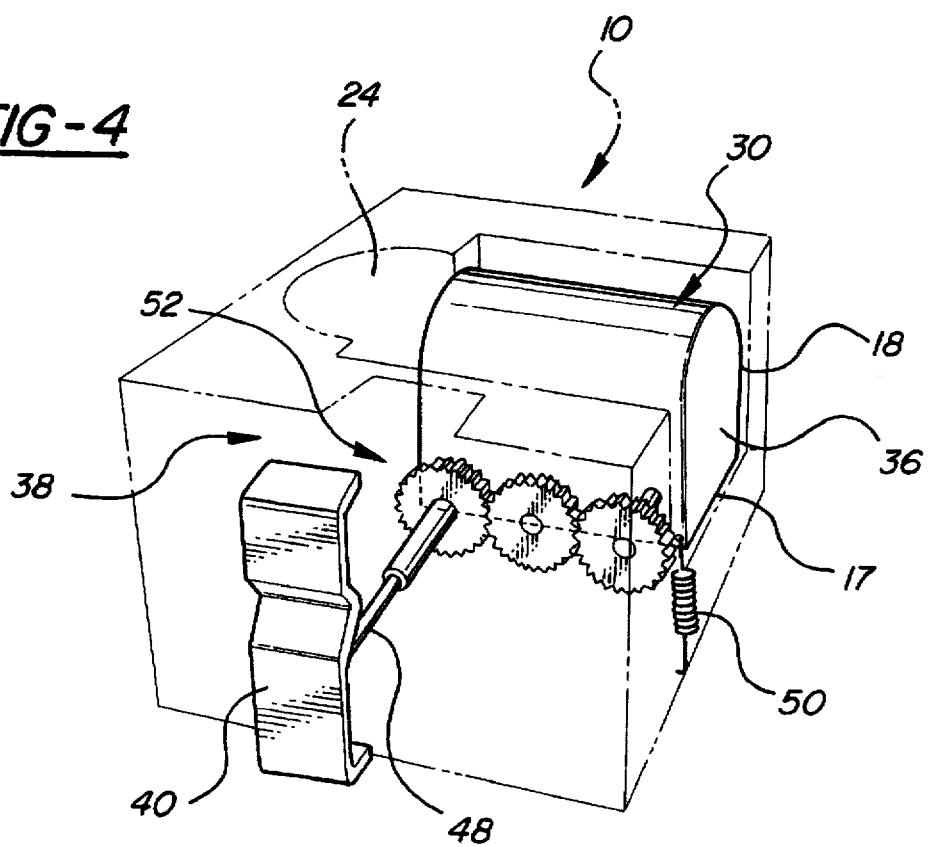
FIG. 4 schematically illustrates the internal mechanisms for the subject invention.

A dual, semi-automatic container holder apparatus is illustrated at 10 in the Figures. The cup holder apparatus 10 includes a stored position illustrated in FIG. 2 and a use or extended position illustrated in FIG. 3 wherein a first cup holder 12 and a second cup holder 14 are available for use by the passengers of the vehicle to support containers therein. It is to be understood that the cup holders 12,14 may be utilized to contain and support any type of beverage container of suitable size. The size of each of the cup holders 12,14 can be specifically designed as required to hold designated sized containers.

Figure 1:
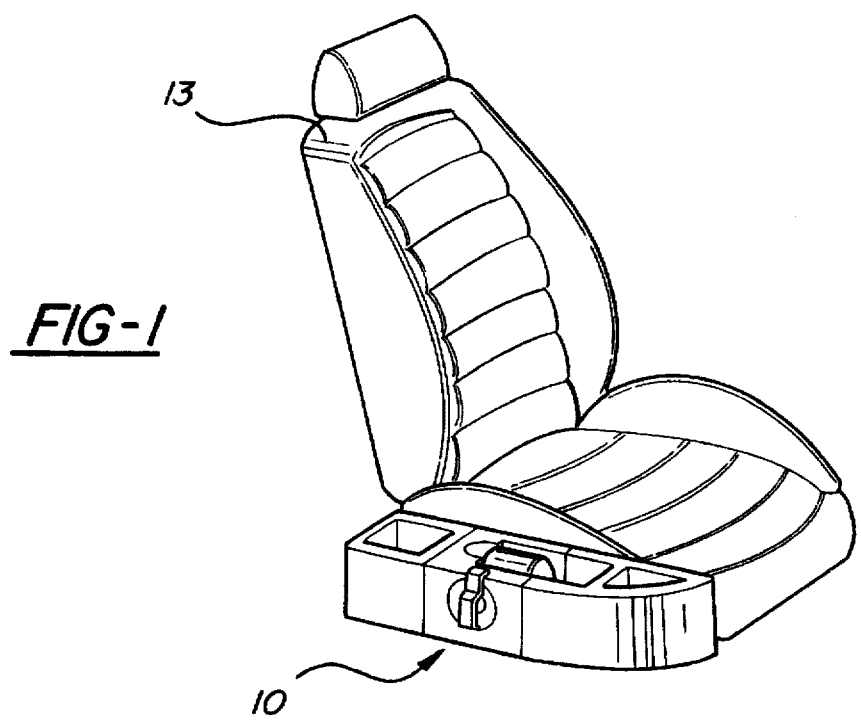
FIG. 1 is a perspective view of the subject invention in a vehicle seat environment.

The container holder apparatus 10 includes a housing 16 supported by the vehicle. The housing 16 may be supported anywhere within the vehicle, such as an instrument panel, console, or seat. In the preferred embodiment, the housing 16 is supported in a seat 13 as illustrated in FIG. 1, to allow the user access thereto along the side of the seat 13 with the cup holders 12,14 projecting or extending from the front of the seat.

The housing 16 includes a generally rectangular shaped pocket 18 formed through the top side 20 of the housing 16 and which also extends through a portion of a front side 22 of the housing 16. In other words, the pocket 18 has open sides in the top side 20 and front side 22. The pocket 18 includes a semi-circular cavity 24 extending from the rectangular portion 26 of the pocket 18 and toward the rear side 28 of the housing 16. The semi-circular cavity 24 provides a portion of the first cup holder 12 to support a container. The rectangular portion 26 supports the second cup holder 14 in the stored position and acts as a portion of the first cup holder 12 in the extended position.

The second cup holder 14 is formed of a generally cup-shaped member having a pair of substantially straight or flat sides 32 opposing one another and connected by opposing arcuate side 34 thereby providing the support for a beverage container therein. The cup shaped member 30 also includes a base 36 for supporting the beverage container. The flat sides 32 are spaced a distance slightly less than the width of the pocket 18 to fit and rotate into the rectangular portion 26.

The second cup holder 14 is pivotally connected to the housing 16 and particularly with the pocket 18 thereof. In the preferred embodiment, a first of the arcuate sides 34 at a lower end thereof and adjacent to base 36, is pivotally connected within the pocket 18 adjacent the front side 22 of the housing 16. In the extended position, the base 36 partially remains within the pocket 18, e.g., one quarter of the cup holder 14. In operation, the second cup holder 14 is allowed to pivot upwardly rotating, through a vertical direction from the extended position so that the second cup holder 14 pivots into the first cup holder 12. As can be appreciated, with the pivot connection at one of the arcuate sides 34, the same first arcuate side 34 pivots downwardly against the pocket base 17 of the housing 16 while the opposing arcuate side 34 rotates upwardly and extends horizontally over the first arcuate side 34. In this manner, the base 36 of the second cup holder 14 lies in a vertical position and forms a front cover for the pocket 18. In use, the second cup holder 14 is rotated upwardly and outwardly out of the first cup holder 12 so that the arcuate sides 34 extend vertically and the base 36 extends horizontally.

The cup holder apparatus 10 includes a control assembly 38 for controlling the pivoting movement of the second cup holder 14 into and out of the first cup holder 12 between the stored and use positions, respectively. The control assembly 38 includes a handle 40 rotatedly connected to the housing 16. The handle 40 is rotatable to control the pivoting and rotation of the second cup holder 14 in direct response thereto. The housing 16 on an outer side 42 adjacent and perpendicular to the front side 22 and top side 20 includes a longitudinal rectangular recess 44 extending vertically therein for receiving the handle 40 in a vertical locked position preventing rotation of the handle 40. The handle 40 is set within the recess 44 in the non-use or stored position. The recess 44 includes a circular portion 46 of a diameter less than the longitudinal length of the handle 40 to allow the user to hold and pull the handle 40. The handle 40 is connected to a telescoping shaft 48, which allows the handle 40 to be pulled straight and outwardly from the recess 44, and thereafter rotated with and in the same direction as the second cup holder 14 out of the first cup holder 12 to the use position. Depending on the rotation required, suitable gearing 52 may interconnect the shaft 48 and second cup holder 14. The telescoping shaft 48 and handle 40 are springly biased to a retracted position such that a user must provide some tension to pull the handle 40 outwardly. The second cup holder 14 is biased by a spring 50 to the rotated and use position such that once the handle 40 is pulled outwardly from the recess 44, the second cup holder 14 will automatically be biased to the open or use position aid rotation therethrough. In the use position of the second cup holder 14, the handle 40 is rotated so it is transverse to the recess 44 and therefore cannot be accidentally pushed against the housing 16 in an attempt to close the second cup holder 14. The handle 40 and second cup holder 14 are held together open under the spring 50. A user must rotate the handle 40 against the spring 50 bias to its vertical position to then be biased within the recess 44.

Internal tracking within the housing 16, such as by a guide pin and slot or rack and pinion, may be additionally used to guide the second cup holder 14 to its fully extended and use position. Such types of internal tracking are commonly known in the arts and can be applied to the teachings herein.

In operation, the second cup holder 14 is stored within the first cup holder 12 in the stored position. In order to access the cup holders 12,14, the user pulls the handle 40 outwardly from the housing 16 and then rotates the handle 40 once extended far enough to clear the recess 44 in the clockwise direction. Such rotation is directly associated with rotation of the second cup holder 14 to the use position which rotates the second cup holder 14 through a 90° vertical rotation. This moves the second cup holder 14 from the stored position with the base 36 in a vertical position and the arcuate sides 34 in a horizontal position through to the use position with the base 36 in a horizontal position and the arcuate sides 34 extending vertically. In order to store the cup holder 14 when not in use, the user rotates the handle 40 approximately 90° in the counter-clockwise clockwise direction, and the telescoping shaft 48 biases the handle 40 to within the recess 44 and into the housing 16 thereby locking the handle 40 in the stored position.

The invention has been described in the illustrated manner, and it is to be understood the terminology which has been used is intended to be in the nature of words of description rather than of limitation. Many modifications and variations of the present invention are possible in light of the above teachings. It is, therefore, to be understood that within the scope of the appended claim, the invention may be practiced otherwise than as specifically described.

What is claimed is:

1. A cup holder apparatus for supporting a first and second containers, said apparatus comprising:

a housing;

a first cup holder non-rotatably supported by said housing for supporting the first container;

a second cup holder pivotally connected to said housing for rotating between a stored position wherein said second cup holder is positioned within said first cup holder thereby preventing either of said first cup holder or second cup holder to receive either of the containers and a use position with the second cup holder extending outwardly from said first cup holder allowing said first and said second cup holders to each receive a beverage container, said second cup holder rotating from a first horizontally collapsed stored position to a second vertically extending use position.

2. An apparatus as set forth in claim 1 wherein said housing includes a top side, an adjacent front side, said housing including a pocket extending through said top side and said front side forming said first cup holder.

3. An apparatus as set forth in claim 2 wherein said second cup holder comprises a cup-shaped member having a base and vertical sides in said use position, said cup-shaped member being pivotally and rotatably connected to said pocket at a position adjacent said base and one of said vertical sides so that said second cup holder pivots between said stored position with said base vertically positioned and at least one of said sides moved to a horizontal position within said first cup holder and a use position with said base in a horizontal supporting position and partially within said housing and said least one of said sides in a vertical position.

4. An apparatus as set forth in claim 3 further including a handle connected to said housing and operatively connected to said second cup holder for controlling rotation of said second cup holder between said stored position and said use position.

5. An apparatus as set forth in claim 1 wherein said first cup holder is fixedly supported by said housing in a non-moveable position with respect to said housing.

6. A cup holder apparatus for supporting a first and second containers, said apparatus comprising:

a housing;

a first cup holder non-rotatably fixedly supported by said housing for supporting a first container in a non-moveable position with respect to said housing;

a second cup holder pivotally connected to said housing for rotating between a stored position wherein said second cup holder is positioned within said first cup holder and a use position with the second cup holder extending outwardly from said first cup holder allowing said first and said second cup holders to each receive either of the containers, said second cup holder rotating from a first horizontally collapsed stored position to a second vertically extending use position.

7. A cup holder apparatus for supporting a first and second containers, said apparatus comprising:

a housing;

a first cup holder non-rotatably supported by said housing for supporting the first container;

a second cup holder pivotally connected to said housing for rotating between a stored position wherein said second cup holder positioned within said first cup holder and a use position wherein the second cup holder extending outwardly from said first cup holder allowing said first and said second cup holders to each receive either of the containers, said second cup holder rotating from a first horizontally collapsed stored position to a second vertically extending use position; and said second cup holder comprising a cup-shaped member having a base and vertical sides in said use position, said cup-shaped member being pivotally and rotatably connected to a pocket at a position adjacent said base and one of said vertical sides so that said second cup holder pivots between said stored position with said base vertically positioned and at least one of said sides moved to a horizontal position within said first cup holder and a use position with said base in a horizontal supporting position and partially within said housing and said at least one of said sides in a vertical position.

* * * * *

UNITED STATES PATENT AND TRADEMARK OFFICE
CERTIFICATE OF CORRECTION

PATENT NO. : 5,690,308
DATED : November 25, 1997
INVENTOR(S) : Tomislav Jankovic It is certified that error appears in the above-indentified patent and that said Letters Patent is hereby corrected as shown below:

Column 3, line 50, delete "clockwise" (second occurrence).

Column 4, Claim 6, line 5, "a" (first occurrence), should be -- the --.

Column 4, Claim 7, line 8, after "holder" insert -- is --.

Column 4, Claim 7, line 9, "wherein" should be -- with --.

Signed and Sealed this

Third Day of February, 1998

Attest:

BRUCE LEHMAN

*Attesting Officer*  *Commissioner of Patents and Trademarks*